US012692843B2

(12) United States Patent
Jayaraman et al.

(10) Patent No.: US 12,692,843 B2
(45) Date of Patent: Jul. 28, 2026

(54) APPARATUS FOR DETERMINING ORIENTATION OF A SEGMENT OF A WIND TURBINE BLADE AND A METHOD THEREOF

(71) Applicant: LM WIND POWER A/S, Kolding (DK)

(72) Inventors: Sri Praabhu Jayaraman, Nelamangala Taluk (IN); Paul Damian Michael Todd, Eastleigh (GB); Andrew M. Rodwell, Schenectady, NY (US)

(73) Assignee: LM Wind Power A/S, Kolding (DK)

( * ) Notice: Subject to any disclaimer, the term of this patent is extended or adjusted under 35 U.S.C. 154(b) by 412 days.

(21) Appl. No.: 18/273,596

(22) PCT Filed: Mar. 10, 2022

(86) PCT No.: PCT/EP2022/056168
§ 371 (c)(1),
(2) Date: Jul. 21, 2023

(87) PCT Pub. No.: WO2022/189562
PCT Pub. Date: Sep. 15, 2022

(65) Prior Publication Data
US 2024/0093672 A1 Mar. 21, 2024

(30) Foreign Application Priority Data
Mar. 11, 2021 (EP) .................................... 21162172

(51) Int. Cl.
*G01M 5/00* (2006.01)
*F03D 17/00* (2016.01)

(52) U.S. Cl.
CPC ......... *F03D 17/028* (2023.08); *G01M 5/0025* (2013.01); *G01M 5/0041* (2013.01)

(58) Field of Classification Search
CPC .... F03D 17/028; F03D 13/108; F03D 1/0677; G01M 5/0025; G01M 5/0041; F05B 2230/604; F05B 2240/302
See application file for complete search history.

(56) References Cited

U.S. PATENT DOCUMENTS

| | | | |
|---|---|---|---|
| 8,978,262 B2 * | 3/2015 | Spanos | ..................... G01B 5/14 33/645 |
| 9,587,926 B2 * | 3/2017 | Hyslop | ..................... G01B 5/14 |

(Continued)

FOREIGN PATENT DOCUMENTS

| | | | | |
|---|---|---|---|---|
| WO | WO-2020092458 A1 * | 5/2020 | ........... | F03D 1/0675 |
| WO | WO-2022189562 A1 * | 9/2022 | ........... | F03D 13/108 |

*Primary Examiner* — Yaritza Guadalupe-Mccall
(74) *Attorney, Agent, or Firm* — Dority & Manning, P.A.

(57) ABSTRACT

An apparatus 100 for determining orientation of a segment 32 and 30 of a wind turbine blade 28 is disclosed. The apparatus includes an elongated member 1 and a support plate 2 provided at one end of the elongated member 1. The support plate 2 is defined with one or more provisions 4 to facilitate connection with the segment 32 and 30 of the wind turbine blade 28. Further, a measuring plate 3 is provided at another end opposite to the one end of the elongated member 1, where the measuring plate 3 is defined with a substantially airfoil profile 35. The measuring plate 3 includes a plurality of markers 18 disposed along an airfoil region 34 where, each of the plurality of markers 18 is indicative of one or more of multiple parameters to determine the orientation of the segment 32 and 30.
FIG. 6 is the representative figure.

15 Claims, 10 Drawing Sheets

(56) References Cited

U.S. PATENT DOCUMENTS

| | | | |
|---|---|---|---|
| 11,719,222 B2 * | 8/2023 | Broome ................ | F03D 1/0675 |
| | | | 416/223 R |
| 12,025,434 B2 * | 7/2024 | Cordova Magana ........................ | |
| | | | G01B 5/0009 |
| 2008/0203235 A1 * | 8/2008 | Sassatelli .............. | F01D 25/285 |
| | | | 244/35 R |
| 2014/0144034 A1 * | 5/2014 | Spanos ................ | F01D 25/285 |
| | | | 33/645 |
| 2015/0132137 A1 * | 5/2015 | Humblot .............. | F03D 1/0633 |
| | | | 156/92 |
| 2016/0245637 A1 * | 8/2016 | Hyslop ................... | G01B 5/14 |
| 2020/0040868 A1 * | 2/2020 | Broome ................ | F03D 1/0675 |
| 2020/0088169 A1 * | 3/2020 | Lund-Laverick ..... | F03D 1/0675 |
| 2023/0124944 A1 * | 4/2023 | Cordova Magana .... | G01B 5/24 |
| | | | 33/534 |
| 2024/0093672 A1 * | 3/2024 | Jayaraman .......... | G01M 5/0025 |

* cited by examiner

APPARATUS FOR DETERMINING ORIENTATION OF A SEGMENT OF A WIND TURBINE BLADE AND A METHOD THEREOF

This is a National Phase Application filed under 35 U.S.C. 371 as a national stage of PCT/EP2022/056168, filed Mar. 10, 2022, an application claiming the benefit of European Application No. 21162172.7, filed Mar. 11, 2021, the content of each of which is hereby incorporated by reference in its entirety.

FIELD OF THE INVENTION

Present invention relates to a wind turbines. Particularly but not exclusively, the present disclosure relates to an apparatus for determining orientation of an aero foil profile of the wind turbine blade. Further embodiments of the present disclosure disclose the apparatus for determining the orientation along the aero foil profile of a tip segment and a root segment in the wind turbine blade.

BACKGROUND OF THE DISCLOSURE

Wind power is considered to be one of the cleanest and most environmentally friendly energy sources presently available. Due to this, wind turbines have gained increased attention in this regard. A modern wind turbine typically includes a tower, a generator, a gearbox, a nacelle, and a rotor having a rotatable hub with one or more wind turbine blades. The wind turbine blades capture kinetic energy of wind using known airfoil principles. The wind turbine blades transmit the kinetic energy in the form of rotational energy to turn a shaft coupling the wind turbine blades to a gearbox, or if a gearbox is not used, directly to the generator. The generator then converts the mechanical energy to electrical energy that may be deployed to a utility grid.

The wind turbine blades generally include a root segment and a tip segment. The root and the tip segment, each include a suction side shell and a pressure side shell typically formed using molding processes that are bonded together at bond lines along a leading and a trailing edges of the blade. Further, the pressure and suction shells of the root segment are relatively lightweight and have structural properties which are not configured to withstand the bending moments and other loads exerted on the wind turbine blade during operation. Thus, to increase the stiffness, buckling resistance and strength of the wind turbine blade, the body shell of the root segment is typically reinforced using one or more structural components that engage the inner pressure and suction side surfaces of the shell halves. The pressure side shell and the suction side shell along with the intermediate reinforcing member are sealed together using a suitable adhesives forming the root segment. The root segment and the tip segment are usually joined together by a spar structure to form the complete wind turbine blade. The spar structure may include a first part connected to the tip segment and a second part connected to the root segment. The first and the second parts are defined with apertures and a locking pin is usually provided inside the apertures for connecting the first and the second parts of the spar structure. Thus, the root and the top segments of the wind turbine blade are also connected. The above configuration of separately manufacturing the root segment and tip segment results in easier manufacturing process. Further, assembling the root and tip segment on site may reduce the cost of transportation and erection of wind turbines. The respective blade segments may be transported to the erection site individually, where they can be assembled to form the wind turbine blade.

Generally, damage in wind blades can arise due to manufacturing defects, water ingress, variable loading due to wind, operational errors etc. In some cases, wind turbine blades may often be imperilled by lightning strikes. Lightning strikes often damage the sensitive equipment that controls the actual system of the wind turbine including the sensors, motors and actuators that are responsible for steering the turbine equipment into the wind itself. When a turbine blade is struck by lightning, its temperature will raise immediately resulting in expansion of air within the blade. The blade may thus deform and in some instances the blade may also explode due to the sudden expansion of air. High temperature due to the lightning strikes will damage the surface of the blade, melt the adhesive, and crack the leading and trailing edges. Undetected damage will significantly shorten the lifespan of the blades. Damage to the sensors or other electronic systems are often repaired by transporting the damaged component to the site and replacing the same. However, physical blade damage is the most expensive and disruptive damage caused by lightning strikes.

A damaged segment of the blade is typically disassembled and is further transported to the manufacturing plant. The aero foil orientation of a damaged segment is measured at the manufacturing plant. Based on the measured values, a similar segment of the wind turbine blade is manufactured. The manufactured segment is now transported back to the site and is further assembled with the undamaged segment to form the wind turbine blade.

For instance, if the tip segment of the wind turbine blade is damaged, the tip segment is disassembled from the root segment and is transported to the manufacturing plant. The aero foil orientation of the damaged tip segment is measured, and another tip segment is manufactured. The newly manufactured tip segment is further transported and assembled with the root segment on site. The above process of transporting the damaged segment to the manufacturing plant for the sole purpose of determining the orientation along the aero foil region of the damaged segment is time consuming and the overall operational costs increase drastically.

With advancements in technologies, computational orientation measuring machines are increasingly being used to determine the orientation of the aero foil profile in the wind turbine blade. These machines are bulky and are transported by trucks onto the site, where the orientation of aero foil region along the tip or root segment of the wind turbine blade is measured. These machines are extremely sensitive to dust and are required to be transported and operated in a controlled environment. Consequently, the transportation and operational costs are high and there is no significant cost reduction when compared to transporting the damaged segment itself. Further, the computational orientation measuring machines are very expensive and cannot be leveraged for a up tower condition.

It is therefore an object of the present invention to provide a wind turbine blade with an improved locking pin arrangement.

SUMMARY OF THE INVENTION

In a non-limiting embodiment of the disclosure, an apparatus for determining orientation of a first segment and a second segment is disclosed. The apparatus includes an elongated member and a support plate provided at one end of the elongated member. The support plate is defined with one or more provisions to facilitate connection with the first segment and the second segment. A measuring plate is provided at another end opposite to the one end of the elongated member where the measuring plate is defined with a substantially airfoil profile and includes a plurality of markers disposed along an airfoil region. Further, each of the plurality of markers is indicative of one or more of multiple parameters to determine the orientation of the first segment and the second segment.

In an embodiment, the orientation of the airfoil region of the first segment and the second segment of a wind turbine blade is determined using the apparatus.

In an embodiment, the segment of the wind turbine blade includes a root segment and a tip segment.

In an embodiment, the provision is an aperture configured to accommodate a second pin extending from the tip segment.

In an embodiment, the provision is a first pin configured to reside in the aperture defined in a root segment of the wind turbine blade.

In an embodiment, shape of the measuring plate substantially corresponds to the airfoil region of the segment of the wind turbine blade.

In an embodiment, the multiple parameters include diameter of the airfoil region and length of the airfoil region is determined.

In an embodiment, at least one second side plate is provided at a pre-determined distance from the elongated member where, the second side plate extends in a direction perpendicular to the elongated member and connects to the measuring plate.

In an embodiment, the second side plate is provided with a bushing and a handle for positioning the measuring plate adjacent to the airfoil region of the segment.

In an embodiment, at least one reinforcement member extending from the side plate to the measuring plate is provided for retaining the shape of the measuring plate.

In an embodiment, each of the plurality of markers are adjustable to conform to the airfoil region of the segment of the wind turbine blade.

In an embodiment, relative orientation of the second segment is determined with respect to the first segment.

In a non-limiting embodiment of the disclosure, a system for determining orientation of a tip segment and a root segment of a wind turbine blade is disclosed. The system includes a first tool assembly for determining orientation along an airfoil region of the tip segment. The first tool assembly includes at least one first elongated member with a first support plate provided at one end of the first elongated member. A first measuring plate is provided at another end opposite to the one end of the first elongated member. Further, a plurality of first markers is disposed on the airfoil region where, each of the plurality of first markers is indicative of one or more of multiple parameters to determine the orientation of the tip segment of the wind turbine blade. A second tool assembly for determining orientation of an airfoil region of the root segment of the wind turbine blade is provided. The second tool assembly includes at least one second elongated member and a second support plate provided on one end of the second elongated member. A second measuring plate is provided at another end opposite to the one end of the second elongated member. Further, a plurality of second markers is disposed on the airfoil region where, each of the plurality of second markers is indicative of one or more of multiple parameters to determine the orientation of the root segment of the wind turbine blade.

In an embodiment, the first support plate is defined with at least one provision for accommodating a second pin of a spar structure extending from the tip segment of the wind turbine blade.

In an embodiment, the first measuring plate is defined with an airfoil profile, substantially similar to the airfoil region of the tip segment of the wind turbine blade.

In an embodiment, the second support plate includes at least one first pin, accommodated in a provision defined in the root segment of the wind turbine blade.

In an embodiment, the second measuring plate is defined with an airfoil profile, substantially similar to the airfoil region of the root segment of the wind turbine blade.

In a non-limiting embodiment of the disclosure, a method for determining orientation along an airfoil region of a segment of a wind turbine blade is disclosed. The method includes steps of positioning a tool assembly adjacent to the airfoil region of the segment of the wind turbine blade where the tool assembly includes an elongated member with a support plate. The support plate is aligned with the segment of the wind turbine blade by a provision in the support plate. Further, a measuring plate of an airfoil profile is aligned with the airfoil region of the segment of the wind turbine blade, where the measuring plate is provided at another end of the elongated member. Finally, multiple parameters of the segment of the wind turbine blade are measured by a plurality of markers disposed on the airfoil region to determine the orientation of the segment of the wind turbine blade.

In an embodiment, a method for determining orientation along an airfoil region of a tip segment is disclosed. The method includes positioning a first tool assembly adjacent to the airfoil region of the tip segment of the wind turbine blade, where the first tool assembly includes at least one first elongated member with a first support plate. The first support plate is aligned with the tip segment of the wind turbine blade, by an aperture configured to accommodate a second pin extending from the tip segment. A first measuring plate of an airfoil profile is aligned with the airfoil region of the tip segment of the wind turbine blade, where the first measuring plate is provided at another end of the first elongated member. Finally, multiple parameters of the tip segment of the wind turbine blade are measured by a plurality of first markers disposed on the airfoil region to determine the orientation of the tip segment of the wind turbine blade.

In an embodiment, a method for determining orientation along an airfoil region of a root segment is disclosed. The method involves positioning a second tool assembly adjacent to the airfoil region of the root segment of the wind turbine blade, where the second tool assembly includes at least one second elongated member with a second support plate. The second support plate with the root segment of the wind turbine blade is aligned by a first pin configured to reside in the aperture defined in a root segment of the wind turbine blade. A second measuring plate of an airfoil profile is aligned with the airfoil region of the root segment of the wind turbine blade, where the second measuring plate is provided at another end of the second elongated member. Finally, multiple parameters of the root segment of the wind turbine blade are measured by a plurality of second markers disposed on the airfoil region to determine the orientation of the root segment of the wind turbine blade.

In an embodiment, the tool assembly in maneuvered by a restraining member and a handle provided on the second support plate for aligning the support plate of the tool assembly with the segment of the wind turbine blade.

In an embodiment, the provision defined in the support plate is aligned with another provision defined in the segment of the wind turbine blade for supporting the tool assembly with the segment of the wind turbine blade.

BRIEF DESCRIPTION OF FIGURES

The invention is explained in detail below with reference to an embodiment shown in the drawings, in which.

DETAILED DESCRIPTION

Figure 1:
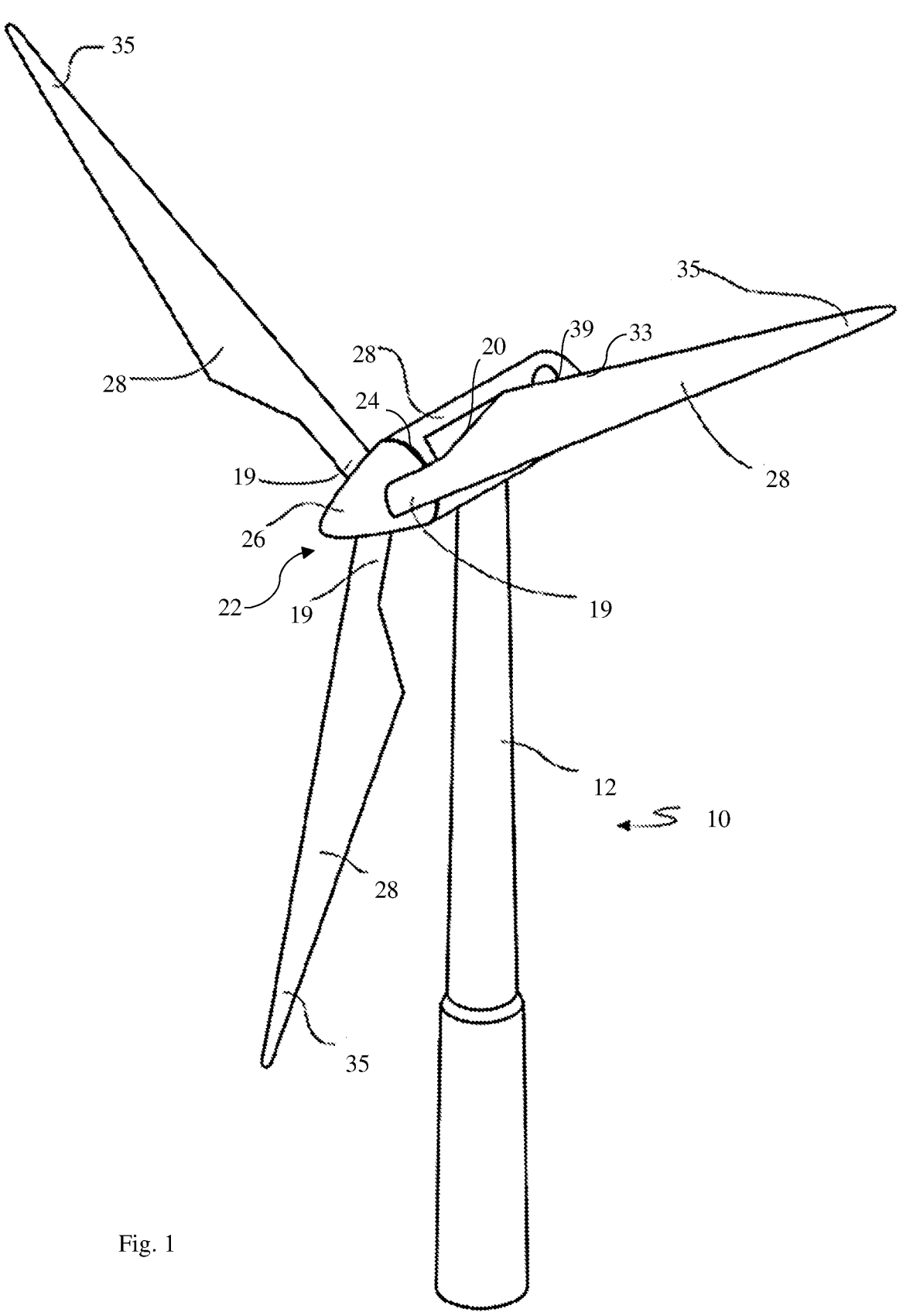
FIG. 1 illustrates a perspective view of one embodiment of a wind turbine, in accordance with an embodiment of the disclosure.

Reference now will be made in detail to embodiments of the invention, one or more examples of which are illustrated in the drawings. Each example is provided by way of explanation of the invention, and not limitation of the invention. In fact, it will be apparent to those skilled in the art that various modifications and variations can be made in the present invention without departing from the scope or spirit if the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the drawings, FIG. 1 illustrates a perspective view of one embodiment of a wind turbine 10 according to the present invention. In the illustrated embodiment, the wind turbine 10 is a horizontal-axis wind turbine. Alternatively, the wind turbine 10 may be a vertical-axis wind turbine as well, based on requirement. In addition, as shown, the wind turbine 10 may include a tower 12 that extends from a support surface 14, a nacelle 33 mounted on the tower 12, a generator 39 positioned within the nacelle 33, a gearbox 20 coupled to the generator 39, and a rotor 22 that is rotationally coupled to the gearbox 20 with a rotor shaft 24. Further, as shown, the rotor 22 includes a rotatable hub 26 and at least one rotor blade 28 coupled to and extending outward from the rotatable hub 26. As shown, the rotor blade 28 includes a blade tip 37 and a blade root 19.

Figure 2:
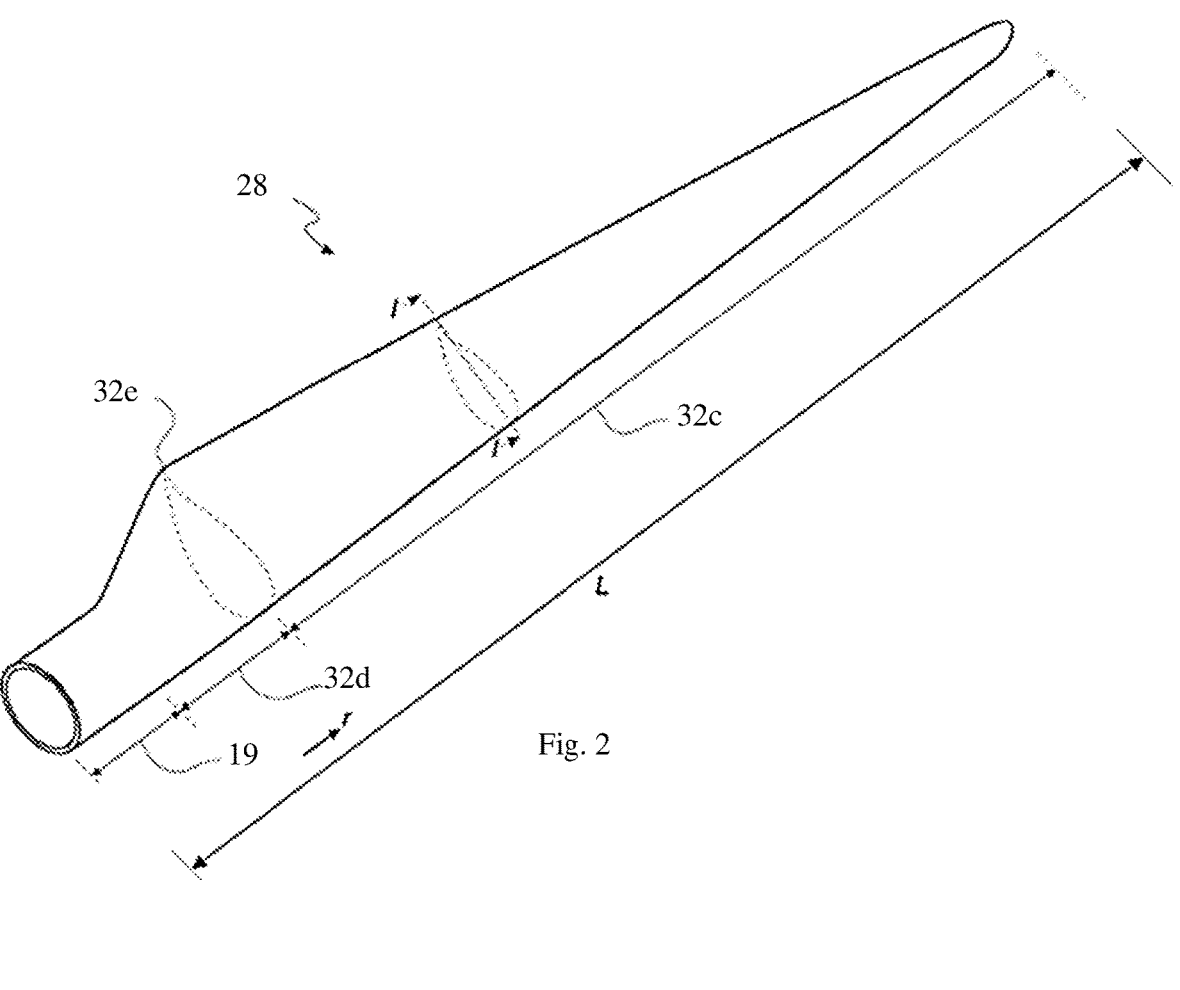
FIG. 2 illustrates a perspective view of a wind turbine blade, in accordance with an embodiment of the disclosure.

FIG. 2 shows a schematic view of a rotor blade 28. The rotor blade 28 has the shape of a conventional wind turbine blade and comprises a root region 19 closest to the hub. Further, a profiled or an airfoil region 34 farthest away from the hub is provided with a transition region 32d between the root region 19 and the airfoil region 32c. The blade 28 comprises a leading edge facing the direction of rotation of the blade 28, when the blade 28 is mounted on the hub, and a trailing edge faces the opposite direction of the leading edge.

The airfoil region 32c is also called the profiled region and has an ideal or almost ideal blade shape with respect to generating lift, whereas the root region 19 due to structural considerations has a substantially circular or elliptical cross-section, which for instance makes it easier and safer to mount the blade 28 to the hub. The diameter or the chord of the root region 19 may be constant along the entire root area. The transition region 32d has a transitional profile gradually changing from the circular or elliptical shape of the root region 19 to the airfoil profile of the airfoil region. The chord length of the transition region 32d typically increases with increasing distance "r" from the hub. The airfoil region has an airfoil profile with a chord extending between the leading edge and the trailing edge of the blade 28. The width of the chord decreases with increasing distance "r" from the hub.

A shoulder 32e of the blade 28 is defined as the position, where the blade 28 has its largest chord length. The shoulder is typically provided at the boundary between the transition region 32d and the airfoil region. FIG. 2 also illustrates the longitudinal extent L, length, or longitudinal axis of the blade.

It should be noted that the chords of different sections of the blade normally do not lie in a common plane, since the blade may be twisted and/or curved i.e., pre-bent, thus providing the chord plane with a correspondingly twisted and/or curved course, this being most often the case in order to compensate for the local velocity of the blade being dependent on the radius from the hub. The blade is typically made from a first shell half structure and a second shell half structure that are glued to each other along bond lines at the leading edge and the trailing edge of the blade 28.

Figure 3:
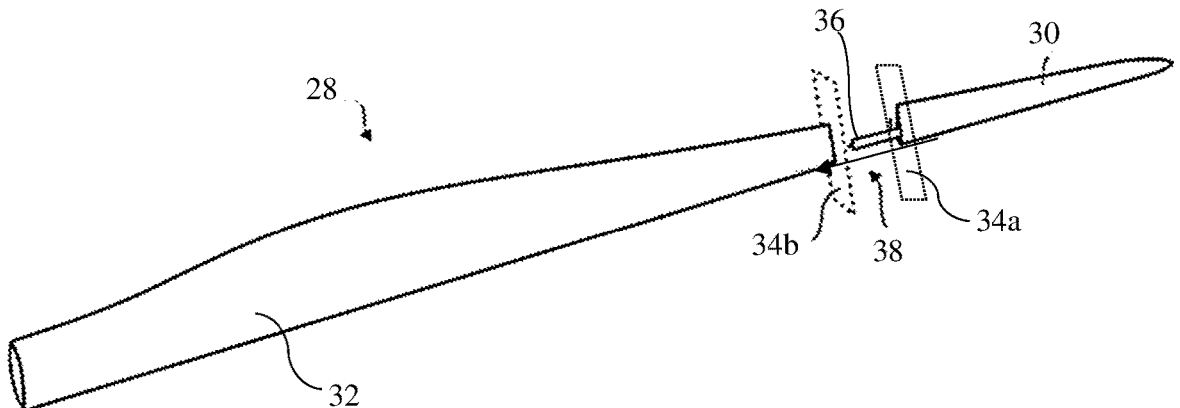
FIG. 3 illustrates a plan view the wind turbine blade having a root segment and a tip segment, in accordance with an embodiment of the disclosure.

Referring now to FIG. 3, a schematic view of a cross section of one of the rotor blades 28 of FIG. 1 is illustrated. In an embodiment, the rotor blade 28 may hereinafter alternatively be referred as blade. As shown, the rotor blade 28 may include a tip end segment 30 and a root end segment 32. Further, as shown, the tip end segment 30 of the blade 28 and the root end segment 32 of the blade 28 may each extend in opposite directions from a chord-wise joint 34. In addition, as shown, each of the tip segment 30 and root segment 32 may include at least one shell member defining an airfoil surface, such as a first shell half structure and a second shell half structure. The tip end segment 30 and the root end segment 32 are connected by at least an internal support structure 36 to facilitate joining of the tip end segment 30 and root end segment 32. The arrow 38 shows that, the segmented rotor blade 28 in the illustrated example includes the tip end segment 30 and the root end segment 32 are joined by inserting the internal support structure 36 into the root end segment 32. In addition, as shown, the root end segment 32 includes multiple spar structures 66 also referred to herein as spar caps that extends lengthwise for connecting with the beam structure 40 of the tip end segment 30 which is shown in more detail in FIGS. 3 and 5.

Figure 4:
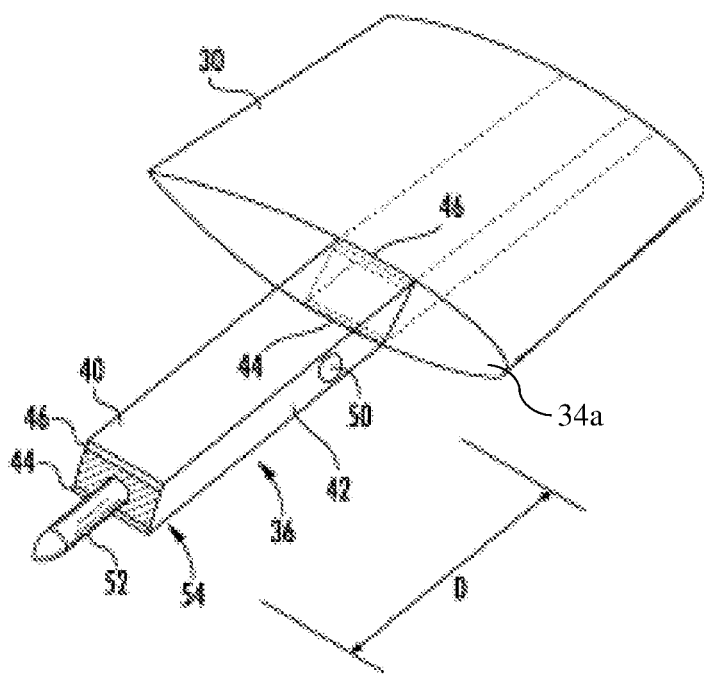
FIG. 4 illustrates a perspective view of a section tip end of the blade, in accordance with an embodiment of the disclosure.

Referring now to FIG. 4, a perspective view of a section of the tip end segment 30 according to the present invention is illustrated. As shown, the tip end segment 30 includes a beam structure 40 that forms a portion of the internal support structure 36 and extends lengthwise for structurally connecting with the root end segment 32. Further, as shown, the beam structure 40 forms at least a part of a shear web 42 i.e., shear web on the tip end segment of the blade connected with a suction side spar cap 44 and a pressure side spar cap 46. Moreover, as shown, the tip end segment 30 may include one or more first pin joints at a receiving end 54 of the beam structure 40. In one embodiment, the pin joint may include a pin that is in a tight interference fit with a bushing. More specifically, as shown, the pin joints may include at least one pin tube 52 located on the receiving end 54 of the beam structure 40. Thus, as shown, the pin tube 52 may be oriented in a span-wise direction. Further, the tip end segment 30 may also include a pin joint slot 50 located on the beam structure 40. Moreover, as shown, the pin joint slot 50 may be oriented in a chord-wise direction.

Figure 5:
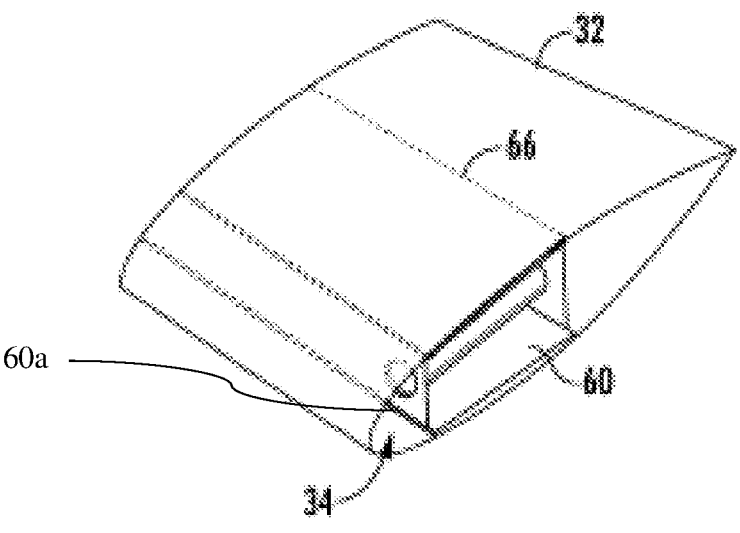
FIG. 5 illustrates a perspective view of a section of the root end of the blade at the chord-wise joint, in accordance with an embodiment of the disclosure.
Figure 6:
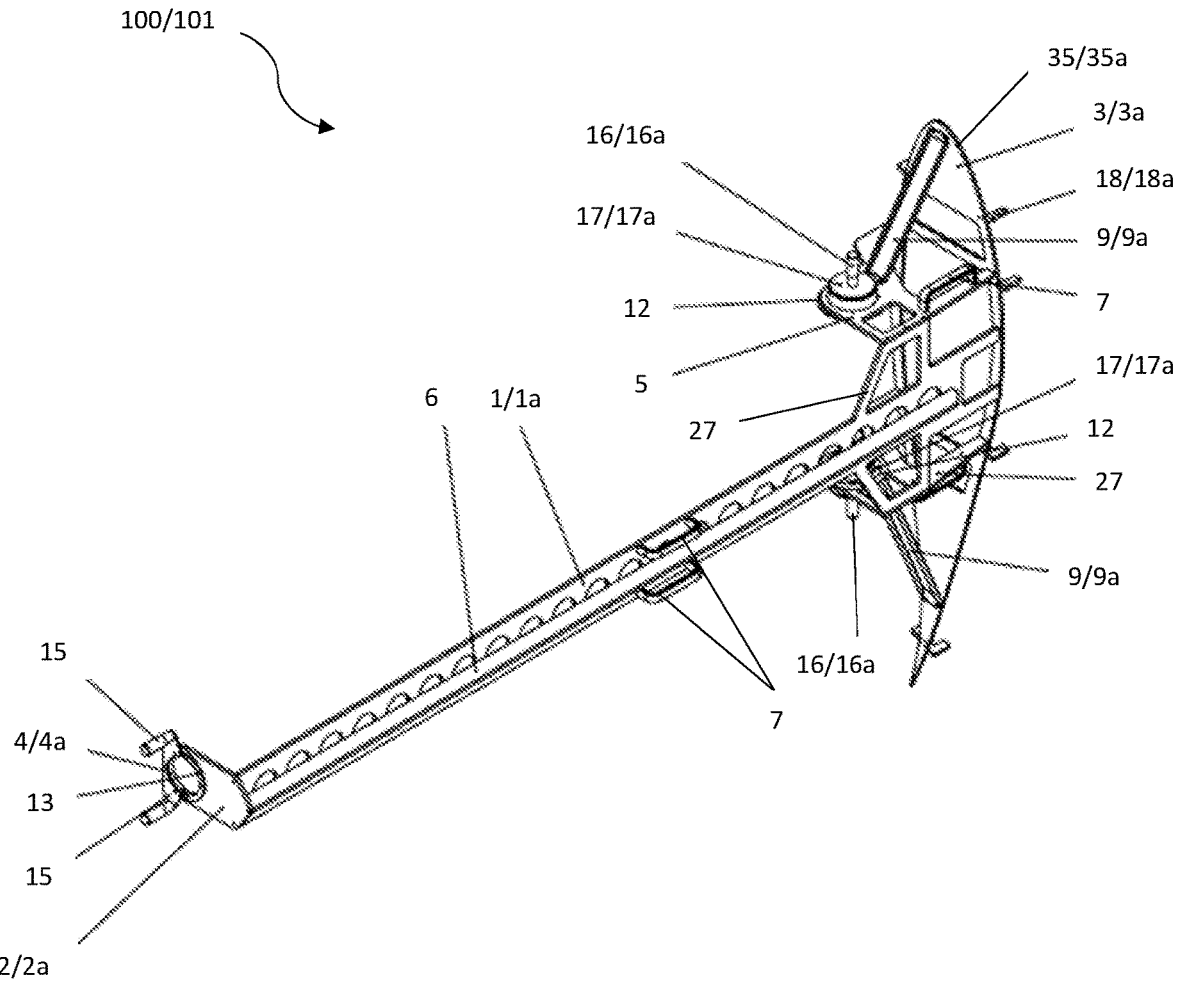
FIG. 6 illustrates a perspective view of an apparatus and a first tool assembly for measuring the orientation of an aerofoil profile of the root and tip segment, particularly the tip segment of the wind turbine blade, in accordance with an embodiment of the disclosure.

Referring now to FIG. 5, a perspective view of a section of the root end segment 32 according to the present invention is illustrated. As shown, the root end segment 32 includes a spar element 60a. The spar element 60a may be defined with a receiving section 60. The receiving section 60 of the spar element 60a may extend lengthwise to a predetermined length within the root end segment 32 for receiving the beam structure 40 of the tip end segment 30. Further, as shown, the receiving section 60 may include the spar structures 66 that extend lengthwise for connecting with the beam structure 40 of the tip end segment 30. In addition, as shown, the receiving section 60 may include a chord-wise member 48 [as can be seen in FIG. 6] having a span-wise pin joint slot 56 defined therethrough. Moreover, as shown, the receiving section 60 may include a chord-wise pin joint slot 58 defined therethrough that aligns with the pin joint slot 50 of the beam structure 40.

FIG. 6 illustrates a perspective view of an apparatus 100 for measuring the orientation of an aerofoil profile 34 of the wind turbine blade 28. The apparatus 100 includes at least one elongated member 1 with a support plate 2 configured on one end of the elongated member 1 and a measuring plate configured at the other end of the elongated member 1. The support plate 2 may be defined with at least one provision 4 for accommodating the apparatus 100 onto the segment 30 or 32 of the wind turbine blade. For instance, the provision 4 defined on the support plate 2 maybe a hole or an aperture 4a which accommodates the first pin 52 at the tip of the internal spar structure 36 [seen from FIG. 4] of the tip segment 30. In an embodiment, the provision 4 may be a first pin 4b configured to reside in an aperture defined in the root segment 32 of the wind turbine blade 28. Further, the measuring plate 3 may be defined with an aero foil shape 35 which is substantially similar to the aero foil region 34 defined along the tip segment 30 and the root segment 32 of the wind turbine blade 28. The measuring plate 3 may include a plurality of markers 18 disposed along the aero foil profile 35. Each of the plurality of markers 18 is indicative of one or more of multiple parameters to determine the orientation of the segment 32 and 30. Further, the apparatus 100 may also include at least one reinforcing member 9 extending form the tip of the measuring plate 3 to the elongated member 1. The reinforcing members 9 ensure that the overall shape of the measuring plate 3 is retained. The apparatus 100 may also include one or more handles 7, 15 for maneuvering the elongated member 1 and the measuring plate 3 to be accommodated with the segments 30 and 32 of the wind turbine blade 28.

Figure 14:
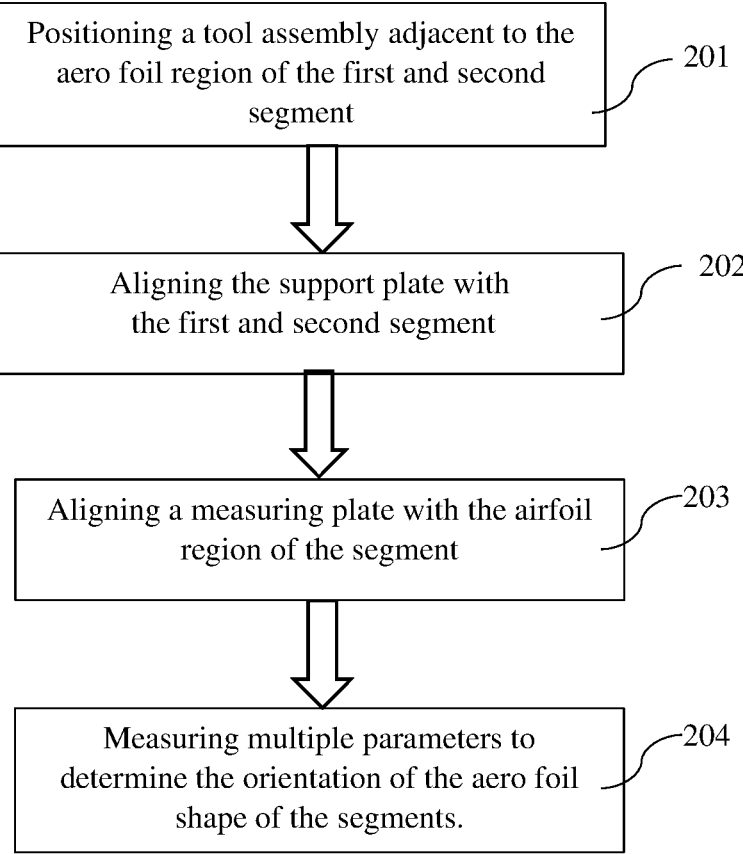
FIG. 14 is a flowchart for determining the orientation of the segment of the wind turbine blade, in accordance with an embodiment of the disclosure.

Referring now to FIG. 14, which illustrates a method of determining orientation of a segment 30 and 32 of a wind turbine blade 28. The first step 201 involves positioning the apparatus 100 adjacent to the aero foil region 34 of the segment 32 and 30 of the wind turbine blade 28. The next step 202 involves aligning the support plate 2 with the segment 32 and 30 of the wind turbine blade 28. The apparatus 100 may be manoeuvred by the handles 7 such that the provision 4 defined in the support plate 2 is suitably accommodated by the segments 30 and 32 of the wind turbine blade 28. Further, the step 203 illustrates, aligning the measuring plate 3 with the aero foil region 34 of the segment 32 and 30 of the wind turbine blade 28. The plurality of markers 18 disposed on the measuring plate 3 may be adjusted to lie on the surface of the segments 30 and 32. The dimensions of the measuring plate 3 along with the position of the markers 18 with respect to the measuring plate 3 may be recorded to determine the orientation of the aero foil profile of the segments 30 and 32.

Figure 7:
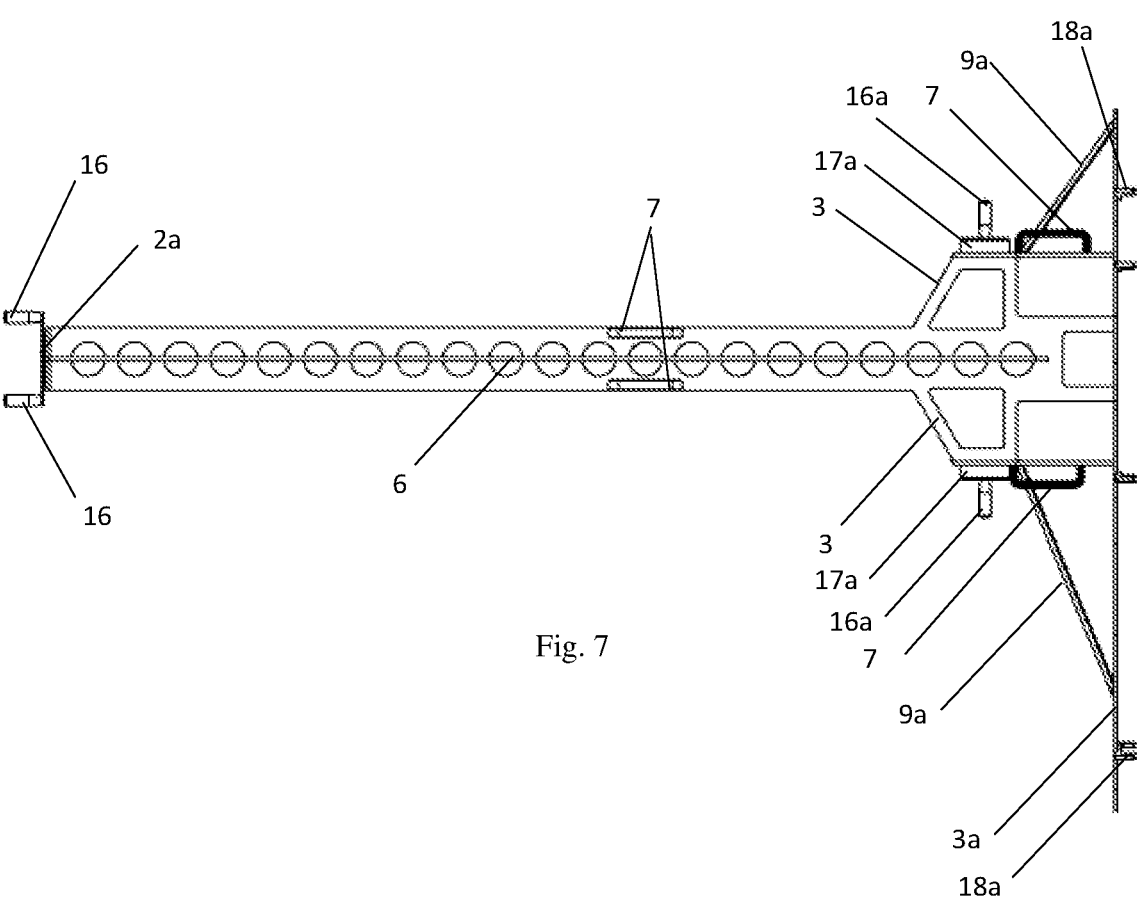
FIG. 7 illustrates a top view of the first tool assembly, in accordance with an embodiment of the disclosure.
Figure 8:
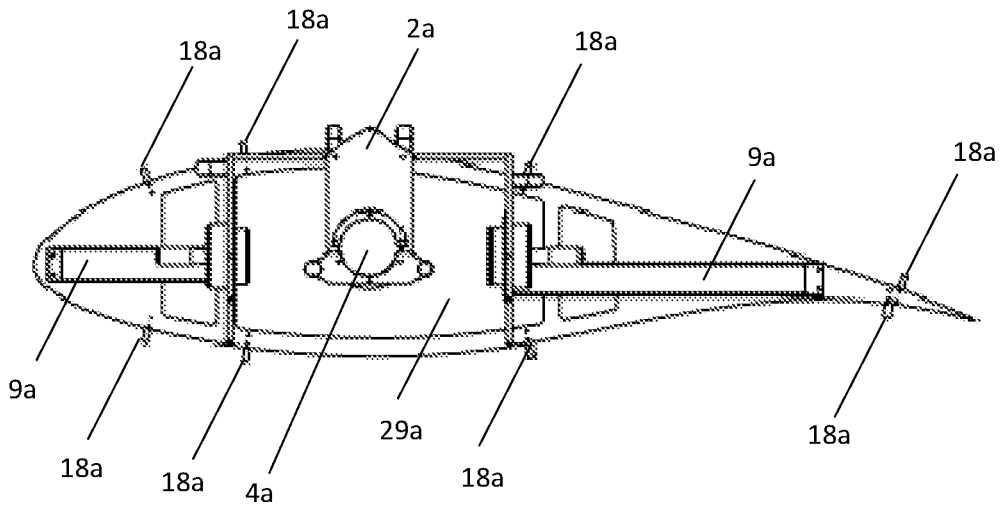
FIG. 8 illustrates a front side view of the first tool assembly, in accordance with an embodiment of the disclosure.

Particularly, FIG. 6 indicates the perspective view of the first tool assembly 101 for determining the orientation of the aero foil region 34a of the tip segment 30 in the wind turbine blade 28. FIG. 7 and FIG. 8 illustrates a top view and a front side view of the first tool assembly 101, respectively. The tool assembly 101 includes at least one first elongated member 1a with a first support plate 2a configured on one end of the elongated member 1a and a first measuring plate 3a is configured on the other end of the first elongated member 1a. The first support plate 2a may be fixedly connected to one end of the first elongated member 1a by welding or by any other method known in the art. The first support plate 2a may be aligned with the first elongated member 1a in a direction perpendicular to the first elongated member 1a. Top end of the first support plate 2a may be cantilevered to the first elongated member 1a.

The first support plate 2a may be defined with the aperture 4a and the aperture 4a may further be provided with a bushing 13. The bottom end of the first support plate 2a may be provided with multiple handles 15. These multiple handles 15 on the first support plate 2a may be used to manoeuvre the first support plate 2a while assembling the first support plate 2a onto the tip segment 30. The dimensions of the aperture 4a on the first support plate 2a and the position of the first aperture 4a on the first support plate 2a may be configured to suitably accommodate the first pin 52 of the spar structure 36 [seen from FIG. 4]. The rear surface of the first support plate 2a may be configured to abut the suction side spar cap 44 and the pressure side spar cap 46 [seen form FIG. 4] of the spar structure 36.

The length of the first elongated member 1a may be equal or slightly longer than the length the beam structure 40 [seen from FIG. 4] such that the rear surface of the first support plate 2a snugly fits on the suction side spar cap 44 and the pressure side spar cap 46 [seen form FIG. 4] of the spar structure 36. Further, the length of the first elongated member 1*a* may be configured such that the first measuring plate 3*a* snugly abuts the aero foil region 34*a* of the tip segment 30 in the wind turbine blade 28. The first measuring plate 3*a* configured to the other end of the first elongated member 1*a* may be defined with an aero foil shape 35*a* which is substantially similar to the aero foil region 34*a* of the tip segment 30 of the wind turbine blade 28. The end section of the first elongated member 1*a* accommodating the first measuring plate 3*a* may also accommodate a first side plate 27. The first side plate 27 may extend for a pre-determined length from the first elongated member 1*a*. The first side plate 27 may extend in a direction parallel to the first elongated member 1*a* for a pre-determined distance. In some embodiments, the first side plate 27 may extend to a quarter of the overall first measuring plate's 3*a* length from the centre of the first elongated member 1*a*.

A second side plate 5 may be cantilevered to a free end of the first side plate 27. The second side plate 5 may be configured to extend in a direction perpendicular to the first side plate 27. The first elongated member 1*a* may have a symmetrical configuration where, the first side plate 27 and the second side plate 5 may be provided on both the sides of the first elongated member 1*a*. The second side plates 7 on either side of the first elongated member 1*a* may house a first restraining member 17*a* with a handle 16*a*. The first restraining member 17*a* may be a pin which is accommodated by the beam structure 40 of the spar structure 36. The beam structure 40 may be defined with a provision for accommodating the first restraining member 17*a*. The handle 16*a* on the second side plate 5 may be used to manoeuvre the first tool assembly 101 onto the tip segment 32 of the wind turbine blade 28. The second side plate 5 and the first elongated member 1*a* may also be provided with handles 7 for manoeuvring the first tool assembly 101 onto the tip segment 32 of the wind turbine blade 28. The bottom end of the second side plate 5 may be provided with a bush 12. The bush 12 enables the easy sliding of the first tool assembly 101 onto the spar structure 36 and reduce vibration and noise.

Further, at least one first reinforcing members 9*a* may be provided between the second side plate 5 and the tip of the first measuring plate 3*a*. The first reinforcing members 9*a* may be provided on both the ends of the first measuring plate 3*a*. The first reinforcing members 9*a* ensures that the overall shape of the measuring plate 3*a* is retained. Consequently, the complete surface area of the first measuring plate 3*a* abuts the aero foil region 34*a* along the tip segment 32 of the wind turbine blade 28. The first measuring plate 3*a* may include a plurality of first markers 18*a* disposed along the aero foil profile 35*a*. Each of the plurality of first markers 18*a* is indicative of one or more of multiple parameters to determine the orientation of the tip segment 30. The plurality of first markers 18*a* are adjustable to conform to the aero foil region 34*a* of the tip segment 30.

The first tool assembly 101 is also provided with a third reinforcing member 6. The third reinforcing member 6 extends between the top end of the first support plate 2*a* and the aero foil region 34*a* of the tip segment 32 [seen form FIG. 9]. The third reinforcing member 6 also ensures that first support plate 2*a* snugly fits with the suction side spar cap 44 and the pressure side spar cap 46. The first measuring plate 3*a* may also be defined by a large cut out 29 [seen from FIG. 8]. The cut out 29 may be defined along a central region of the first measuring plate 3*a*. The cut out 29 on the first measuring plate 3*a* accommodates the beam structure 40 of the spar structure 36 as seen from FIG. 9. The beam structure 40 of the spar structure 36 passes through the cut out 29 of the first measuring plate 3*a* during assembly such that the first pin 52 at the tip of the beam structure 40 is accommodated by the aperture 4*a* defined on the first support plate 2*a*.

Figure 9:
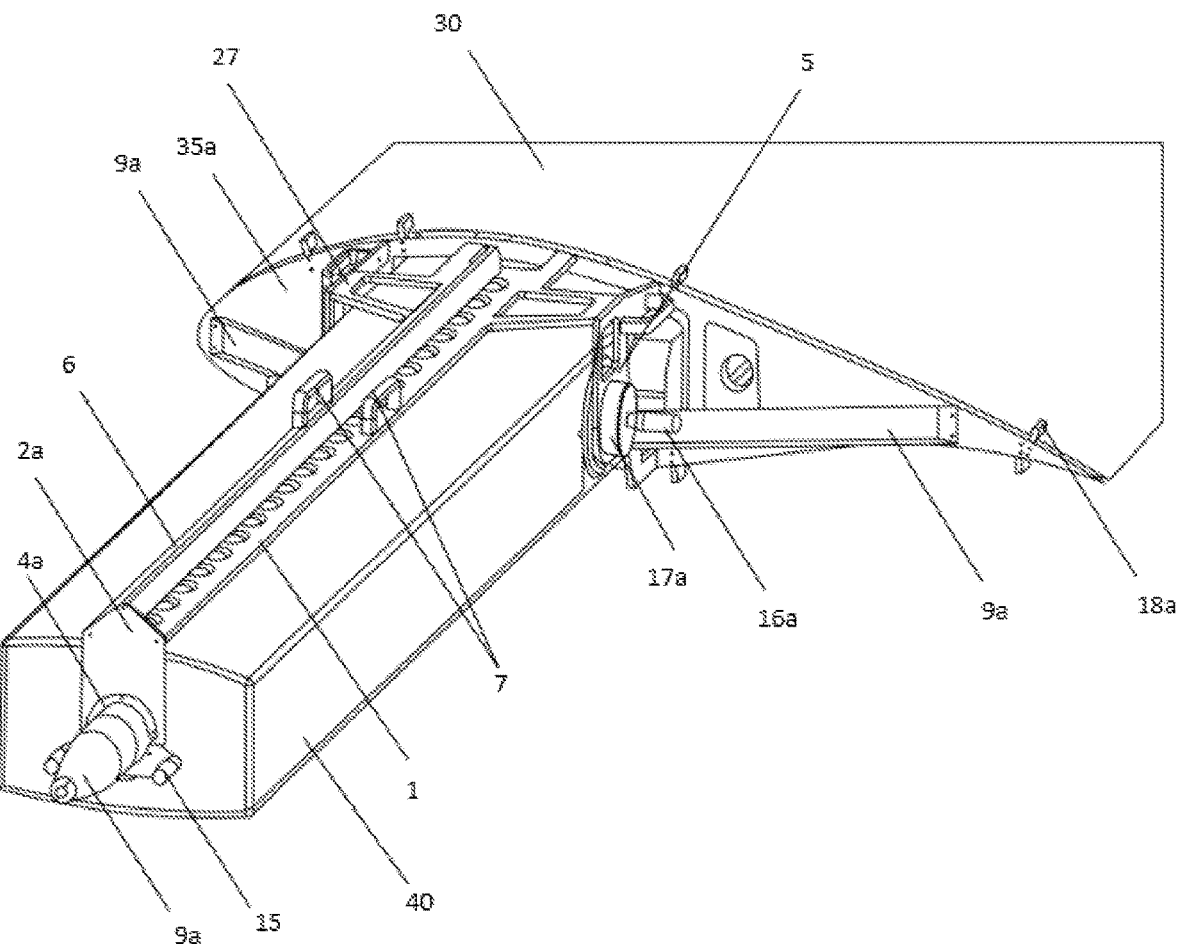
FIG. 9 illustrates a perspective view of the first tool assembly assembled to the tip segment of the wind turbine blade, in accordance with an embodiment of the disclosure.

FIG. 9 illustrates the perspective view of the first tool assembly 101, assembled to the tip segment 30 of the wind turbine blade 28 and FIG. 14 illustrates the method of determining orientation of the tip segment 30 of the wind turbine blade 28. The first step 201 involves the positioning of the first tool assembly 101 adjacent to the aerofoil region 34*a* of the tip segment 30 of the wind turbine blade 28. The first measuring plate 3*a* of the first tool assembly 101 is initially inserted through the beam structure 40 by the large cut out 29 defined in the first measuring plate 3*a*.

The next steps of 202 and 203 involve aligning the first support plate 2*a* with the tip segment 30 of the wind turbine blade 28 and aligning the first measuring plate 3*a* of the aero foil profile 35*a* with the aero foil region 34*a* of the tip segment 30 of the wind turbine blade 28, respectively. After the beam structure 40 is inserted through the cut out 29 defined in the first measuring plate 3*a*, the first elongated member 1*a* may slide on the top surface of the beam structure 40. The bottom surface of the first elongated member 1*a* may come in contact with the top surface of spar structure 40 as the first elongated member 1*a* slides over the beam structure 40. The bushings 12 at the bottom of the second side plate 5 may come in contact with the beam structure 40 while the first elongated member 1*a* slides over the beam structure 40.

Further, the restraining member 17*a* provided on the second side plates 7 on either sides of the first elongated member 1*a* may be fixedly accommodated in the provision defined in the beam structure 40. The restraining members 17*a* may latch onto the provisions defined on the beam structure 40 and thereby restrain the movement of the first tool assembly 101 with respect to the beam structure 40. The first tool assembly 101 may be manoeuvred by the plurality of handles 7 provided on the first elongated member 1*a* and the second side plate 5. As the first measuring plate 3*a* of the first tool assembly 101 is manoeuvred, the first support plate 2*a* may also be manoeuvred by the handles 15 provided on the first support plate 2*a*. The first support plate 2*a* may be manoeuvred such that the aperture 4*a* defined on the first support plate 2*a* accommodates the first pin 52 of the spar structure 36. The rear surface of the first support plate 2*a* may abut against the suction side spar cap 44 and the pressure side spar cap 46 of the spar structure 36, Further, the front surface of the first measuring plate 3*a* may come in contact with the aero foil region 34*a* of the tip segment 30 when the first tool assembly 101 is completely assembled to the tip segment 30 of the wind turbine blade 28.

After the assembly of the first tool assembly 101 to the tip segment 30, the plurality of first markers 18*a* may be adjusted such that the first markers 18*a* conform to the aero foil region 34*a* of the tip segment 30 of the wind turbine blade 28. After adjusting the first markers 18*a*, multiple parameters of the tip segment 30 of the wind turbine blade 28 may be measured. The current embodiment includes eight first markers 18*a* positioned at different location of the aero foil profile 35*a* of the first measuring plate 3*a*. However, the above exemplary embodiment must not be construed as a limitation and any number of first markers 18*a* may be used to measure dimensions of the aero foil region 34*a* of the tip segment 30. The dimensions of the aero foil region 34*a* of the tip segment 30 may be measured by the measuring the position of the first markers 18*a* with respect to the measuring plate 18*a*. The dimensions of the measuring plate 18*a* may already be known and the position of the first markers 18*a* with respect to the first measuring plate 18*a* is indicative of the dimensions of the aero foil region 34*a* of the tip segment 30.

For instance, if the position of the first marker 10*a* with respect to the first measuring plate 3*a* is estimated to be 3 mm, then the actual dimensions of the aerofoil region 34*a* of the tip segment 30 is equal to the dimensions of the first measuring plate 3*a* plus the additional 3 mm estimated by the first marker 18*a*. Dimensions of the aerofoil region 34*a* of the tip segment 30 at various locations may be measured by the plurality of first markers 18*a* and the determined dimensions are fed into a computer aided design model. Based on the fed inputs of the various dimensions along the aerofoil region 34*a* of the tip segment 30, the CAD model generates an overall aero foil region 34*a* of the tip segment 30 with accurate dimensions of the aero foil region 34*a* of the tip segment 30. The determined dimensions of the aero foil region 34*a* of the tip segment 30 may be used to manufacture the tip segment 30.

Figure 10:
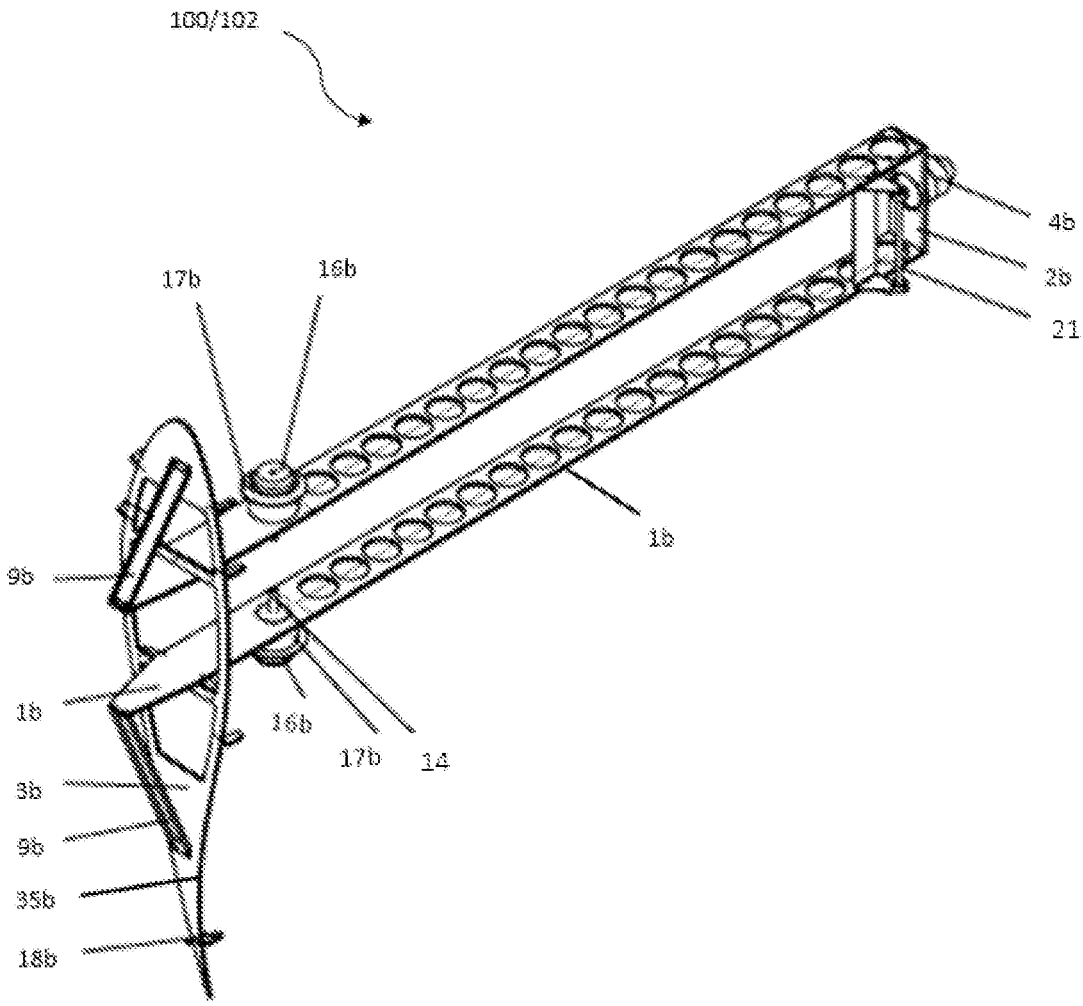
FIG. 10 illustrates a perspective view of a second tool assembly, in accordance with an embodiment of the disclosure.
Figure 11:
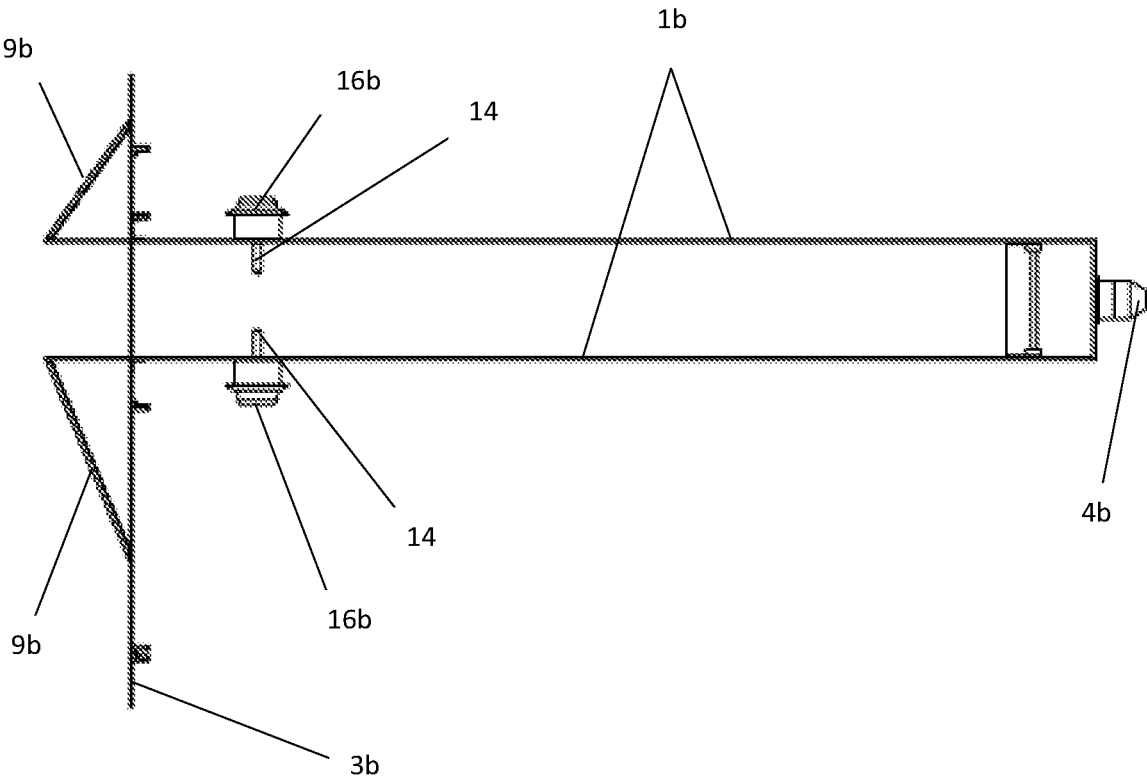
FIG. 11 illustrates a top view of the second tool assembly, in accordance with an embodiment of the disclosure.
Figure 12:
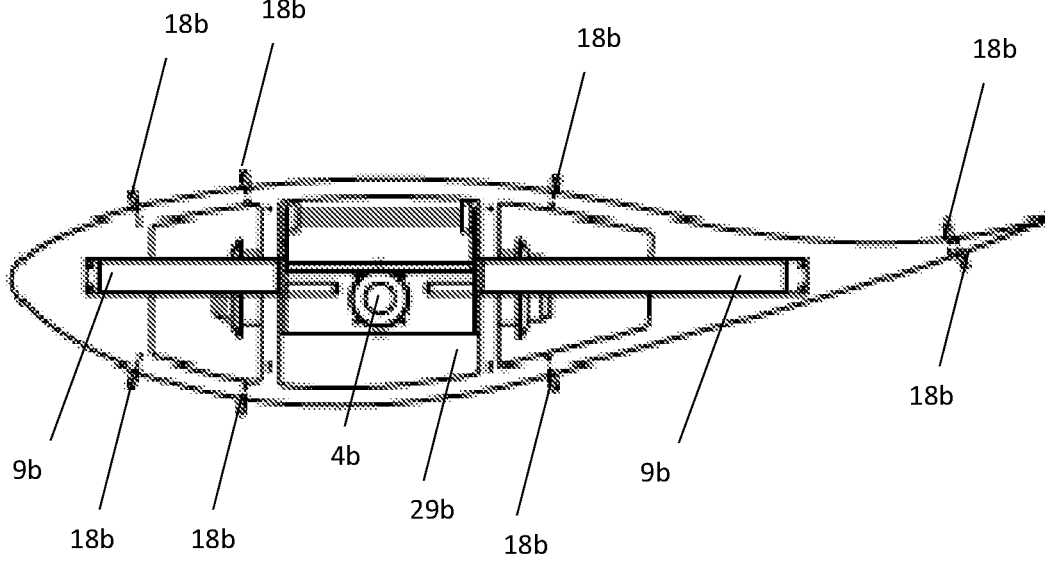
FIG. 12 illustrates a front view of the second tool assembly, in accordance with an embodiment of the disclosure.

FIG. 10 illustrates the perspective view of the second tool assembly 102. FIG. 11 and FIG. 12 illustrates a top view and a front side view of the second tool assembly 102, respectively. The second tool assembly 102 includes at least one second elongated member 1*b* with a second support plate 2*b* configured at one end of the second elongated member 1*b* and a second measuring plate 3*b* is configured on the other end of the second elongated member 1*b*. The second tool assembly 102 may include two second elongated members 1*b* which are configured parallel to each other spaced by a pre-determined distance. The two parallel second elongated members 1*b* may be connected by a second support plate 2*b*. The second support plate 2*b* may be fixedly connected to one end of the second elongated member 1*b* by welding or by any other method known in the art. The second support plate 2*b* may be aligned with the second elongated member 1*b* in a direction perpendicular to the second elongated member 1*b*. Further, the second support plate 2*b* may be positioned between the two second elongated members 1*b*. The second support plate 2*b* may connect the two second elongated members 1*b* and the second support plate 2*b* may be provided with a provision such as a first pin 4*b*. The first pin 4*b* may be structured to reside in an aperture defined in the root segment 32 of the wind turbine blade 28. A rear end of the second elongated member 1*b* may be provided with the at least one handle 21. These handles 21 on the rear end of the second elongated member 1*b* may be used to manoeuvre the second tool assembly 102 onto the root segment 32. Further, the length of the second elongated member 1*b* may be configured such that the second measuring plate 3*b* snugly abuts the aero foil region 34*b* of the root segment 32 in the wind turbine blade 28.

The second measuring plate 3*b* which is configured at the other end of the second elongated member 1*b* may be defined with an aero foil shape 35*b* which is substantially similar to the aero foil region 34*b* of the root segment 32 of the wind turbine blade 28. The second elongated member 1*b* may house a second restraining member 17*b* with a handle 16*b*. The second restraining member 17*b* may be a pin which is accommodated by the root segment 32 of the wind turbine blade 28. The root segment 32 may be defined with a provision [not shown] for accommodating the second restraining member 17*b*. The handle 21 on the second elongated member 1*b* may be used to manoeuvre the second tool assembly 102 onto the root segment 30 of the wind turbine blade 28. The second measuring plate 1*b* may also be defined by a large second cut out 29*b* [seen from FIG. 12]. The second cut out 29*b* may be defined along a central region of the second measuring plate 1*b*. The second cut out 29*b* on the second measuring plate 1*b* accommodates the second elongated members 1*b*. The second elongated members 1*b* may extend beyond the second measuring plate 3*b* for a pre-determined distance. Further, at least one second reinforcing members 9*b* may be provided between the tip of the second measuring plate 3*b* and the second elongated members 1*b*.

The second reinforcing members 9*b* may also act as connecting members, joining the second measuring plate 3*b* and the second elongated members 1*b*. The second reinforcing members 9*b* may be configured to extend between the edges of the second measuring plate 3*b* and the tip along the front end of the second elongated members 1*b*. The second reinforcing members 9*b* ensure that the overall shape of the second measuring plate 3*b* is retained and also act as connecting members between the second measuring plate 3*b* and the second elongated members 1*b*. Consequently, the complete surface area of the second measuring plate 3*b* abuts the aero foil region 34*b* along the root segment 30 of the wind turbine blade 28. The second measuring plate 3*b* may include a plurality of second markers 18*b* disposed along the aero foil profile 35*b*. Each of the plurality of second markers 18*b* is indicative of one or more of multiple parameters to determine the orientation of the root segment 32. The plurality of second markers 18*b* are adjustable to conform to the aero foil region 34*b* of the root segment 32.

Figure 13:
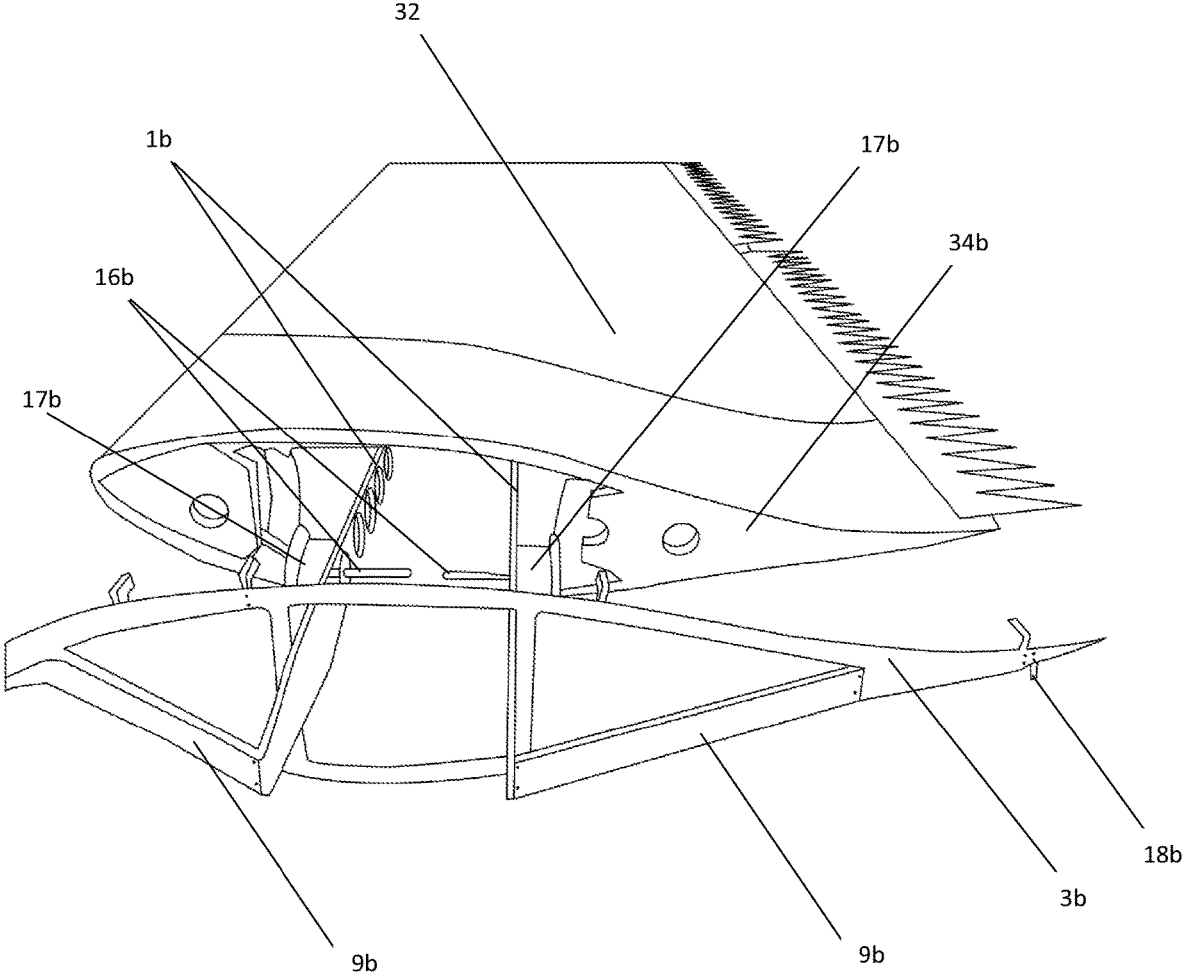
FIG. 13 illustrates a perspective view of the second tool assembly assembled to the root segment of the wind turbine blade, in accordance with an embodiment of the disclosure.

FIG. 13 illustrates the perspective view of the second tool assembly 102 assembled to the root segment 32 of the wind turbine blade 28 and FIG. 14 illustrates the method of determining orientation of the root segment 30 of the wind turbine blade 28. The first step 201 involves the positioning of the second tool assembly 102 adjacent to the aerofoil region 34*b* of the root segment 32 of the wind turbine blade 28. The rear end of the second elongated members 1*b* with the second support plate 2*b* is initially inserted into the root segment 30 of the wind turbine blade 28. The next steps of 202 and 203 involve aligning the first pin 4*b* of the second support plate 2*b* with the root segment 30 of the wind turbine blade 28 and aligning the second measuring plate 3*b* of the aero foil profile 35*b* with the aero foil region 34*b* of the root segment 32 of the wind turbine blade 28, respectively. The second elongated members 1*b* may be pushed to slide within the root segment 30 until the first pin 4*b* on the second support plate 2*b* latches onto the aperture defined in the root segment 30 of the wind turbine blade 28. Further, the second restraining member 17*b* provided on sides of the second elongated member 1*b* may be fixedly accommodated in the provision defined in the root segment 30. The restraining members 17*a* may latch onto the provisions defined on the root segment 30 and thereby restrain the movement of the second tool assembly 102 with respect to the root segment 30. The second tool assembly 102 may be manoeuvred by plurality of handles 21 provided at the rear end of the second elongated member 1*b*. As the second measuring plate 1*b* of the second tool assembly 102 is manoeuvred, the first pin 4*b* may reside in the aperture defined in the root segment 32 of the wind turbine blade 28. The rear surface of the second measuring plate 3*b* may come in contact with the aero foil region 34*b* of the root segment 32 when the second tool assembly 102 is completely assembled to the root segment 32 of the wind turbine blade 28.

After the assembling the second tool assembly 102 to the root segment 32, the plurality of second markers 18*b* may be adjusted such that the second markers 18*b* conform to the aero foil region 34*b* of the root segment 32 of the wind turbine blade 28. Adjustment of the second markers 18*b* helps in measuring multiple parameters of the root segment 32 of the wind turbine blade 28. The current embodiment includes eight second markers 18*b* positioned at different location of the aero foil profile 35*b* of the second measuring plate 3*b*. However, the above exemplary embodiment must not be construed as a limitation and any number of second markers 18*b* may be used to measure dimensions of the aero foil region 34*b* of the root segment 32. The dimensions of the aero foil region 34*b* of the root segment 32 may be measured by the measuring the position of the second markers 18*b* with respect to the second measuring plate 18*b*. The dimensions of the second measuring plate 18*b* may already be known and the position of the second markers 18*b* with respect to the second measuring plate 18*b* is indicative of the dimensions of the aero foil region 34*b* of the root segment 32. Dimensions of the aerofoil region 34*b* of the root segment 32 at various locations is measured by the plurality of second markers 18*b* and the determined dimensions are fed into a computer aided design model. Based on the inputs of the various dimensions along the aerofoil region 34*b* of the root segment 32, the CAD model generates an overall aero foil region 34*b* of the root segment 32 with accurate dimensions of the aero foil region 34*b* of the root segment 32. The determined dimensions of the aero foil region 34*b* of the root segment 32 may be used to manufacture the root segment 32.

Further, the orientation of the tip segment 30 with respect to the root segment 32 of the wind turbine blade 28 may also be determined. As mentioned above in the step 204, inputs of the various dimensions along the aerofoil region 34*a* of the tip segment 30 and the root segment 32 are initially used to generate a CAD model of the overall aerofoil profile of tip segment 30 and the root segment 32. Generally, the tip segment 30 of the wind turbine blade 28 is replaced when damaged and the tip segment 30 is manufactured to be meshigly accommodated with the existing root segment 32 of the wind turbine blade 28. The orientation of the aero foil region 34*b* in the tip segment 30 is generated relative to the aero foil region 34*b* of the root segment 32 such that the tip segment 30 is accurately accommodated with the root segment 32 of the wind turbine blade 28.

In an embodiment, an inexpensive method of measuring the dimensions of the aero foil region 34*a* and 34*b* is enabled by the above-mentioned apparatus 100.

In an embodiment, the transportation of the damaged segment 30 and 32 to the manufacturing industries to determine the orientation along the aero foil region 34*a* and 34*b* of the damaged segment 30 and 32 may be completely avoided since, the above-mentioned apparatus may be used on site to determine the orientation of the aero foil region 34*a* and 34*b*.

In an embodiment, the above-mentioned apparatus 100 may be used to determine the orientation of the aero foil region 34*a* and 34*b* of the segments 30 and 32 after the wind turbine blade 28 is manufactured. The determined values indicative of the orientation along the aero foil region 34*a* and 34*b* of the segments 30 and 32 may be stored digitally and may be procured when a new segment 30 and 32 is to be manufactured for installation for servicing.

The invention is not limited to the embodiments described herein and may be modified or adapted without departing from the scope of the present invention.

Exemplary embodiments of the present disclosure are set out in the following items:

1. An apparatus (100) for determining orientation of a first segment (32) and a second segment (30), the apparatus (100) comprising:

an elongated member (1);

a support plate (2) provided at one end of the elongated member (1), the support plate (2) defined with one or more provisions (4) to facilitate connection with the first segment (32) and the second segment (30);

a measuring plate (3) at another end opposite to the one end of the elongated member (1), wherein the measuring plate (3) is defined with a substantially airfoil profile (35), and includes a plurality of markers (18) disposed along an airfoil region (34), wherein, each of the plurality of markers (18) is indicative of one or more of multiple parameters to determine the orientation of the first segment (32) and the second segment (30).

2. The apparatus (100) according to item 1, wherein the orientation of the airfoil region (34) of the first segment (32; 30) of a wind turbine blade (28) is determined using the apparatus (100).

3. The apparatus (100) according to any of items 1-2, wherein the first segment (32) and the second segment (30) of the wind turbine blade (28) includes a root segment (32) and a tip segment (30).

4. The apparatus (100) according to item 3, wherein the provision (4) is an aperture 4*a* configured to accommodate a second pin (52) extending from the tip segment (30).

5. The apparatus (100) according to any of items 3-4, wherein the provision (4) is a first pin (4*b*) extending from the support plate and is structured to reside in the aperture defined in a root segment (32) of the wind turbine blade (28).

6. The apparatus (100) according to any of items 1-5, wherein shape of the measuring plate (3) substantially corresponds to the airfoil region (34) of the first segment (32) and the second segment (30) of the wind turbine blade (28).

7. The apparatus (100) according to any of items 1-6, wherein the multiple parameters include diameter of the airfoil region (34) and length of the airfoil region (34).

8. The apparatus (100) according to any of items 1-7, comprising at least one second side plate (5) provided at a pre-determined distance from the elongated member (1) wherein, the second side plate (5) extends in a direction perpendicular to the elongated member (1*a*) and connects to the measuring plate (3).

9. The apparatus (100) according to item 8, wherein the second side plate (5) is provided with a bushing (12) and a handle (16) for positioning the measuring plate (3) adjacent to the airfoil region (34) of the first segment (32) and the second segment (30).

10. The apparatus (100) according to any of items 1-9, comprising at least one reinforcement member (9) extending from the side plate (5) to the measuring plate (3) for retaining the shape of the measuring plate (3).

11. The apparatus (100) according to any of items 1-10, wherein each of the plurality of markers are adjustable to conform to the airfoil region (34) of the first segment (32) and the second segment (30) of the wind turbine blade (28).

12. The apparatus (100) according to any of items 1-11, wherein relative orientation of the second segment (30) is determined with respect to the first segment (32).

13. A system 200 for determining orientation of a tip segment (30) and a root segment (32) of a wind turbine blade (28), the system (200) comprising:

a first tool assembly (101) for determining orientation along an airfoil region (34a) of the tip segment (30), the first tool assembly (101) comprising:

at least one first elongated member (1a);

a first support plate (2a) provided at one end of the first elongated member (1a);

a first measuring plate (3a) at another end opposite to the one end of the first elongated member (1a);

a plurality of first markers (18a) disposed on the airfoil region (34a) wherein, each of the plurality of first markers (18a) is indicative of one or more of multiple parameters to determine the orientation of the tip segment (30) of the wind turbine blade (28);

a second tool assembly 102 for determining orientation of an airfoil region (34b) of the root segment (32) of the wind turbine blade (28), the second tool assembly (102) comprising:

at least one second elongated member (1b);

a second support plate (2b) provided on one end of the second elongated member (1b);

a second measuring plate (3b) at another end opposite to the one end of the second elongated member (1b);

a plurality of second markers (18b) disposed on the airfoil region (34b) wherein, each of the plurality of second markers (18b) is indicative of one or more of multiple parameters to determine the orientation of the root segment (32) of the wind turbine blade (28).

14. The system 200 according to item 13, wherein the first support plate (2a) is defined with at least one provision (4a) for accommodating a second pin (52) of a spar structure extending from the tip segment (30) of the wind turbine blade (28).

15. The system 200 according to any of items 13-14, wherein the first measuring plate (3a) is defined with an airfoil profile (35a), substantially similar to the airfoil region (34a) of the tip segment (30) of the wind turbine blade (28).

16. The system 200 according to any of items 13-15, wherein the second support plate (2b) includes at least one first pin (4b), structured to be accommodated in an aperture defined in the root segment (32) of the wind turbine blade (28).

17. The system 200 according to any of items 13-16, wherein the second measuring plate (3b) is defined with an airfoil profile (35b), substantially similar to the airfoil region (34b) of the root segment (32) of the wind turbine blade (28).

18. A method for determining orientation along an airfoil region (34) of a segment (32; 30) of a wind turbine blade (28), the method comprising:

positioning a first tool assembly (101) and a second tool assembly 102 adjacent to the airfoil region (34) of the segment (32; 30) of the wind turbine blade (28), wherein the first tool assembly (101) and a second tool assembly (102) includes an elongated member (1) with a support plate (2);

aligning the support plate (2) with the segment (32; 30) of the wind turbine blade (28), by a provision (4) in the support plate (2);

aligning a measuring plate (3) of an airfoil profile (35) with the airfoil region (34) of the segment (32; 30) of the wind turbine blade (28), wherein the measuring plate (3) is provided at another end opposite to the one end of the elongated member (1);

measuring multiple parameters of the segment (32) or (30) of the wind turbine blade (28) by a plurality of markers (18) disposed on the airfoil region (34) to determine the orientation of the segment (32; 30) of the wind turbine blade (28).

19. The method according to item 18, the method comprising:

positioning a first tool assembly 101 adjacent to the airfoil region (34a) of the tip segment (30) of the wind turbine blade (28), wherein the first tool assembly 101 includes at least one first elongated member (1a) with a first support plate (2a);

aligning the first support plate (2a) with the tip segment (30) of the wind turbine blade (28), by an aperture (4a) configured to accommodate a second pin (52) extending from the tip segment (30);

aligning a first measuring plate (3a) of an airfoil profile (35a) with the airfoil region (34a) of the tip segment (30) of the wind turbine blade (28), wherein the first measuring plate (3a) is provided at another end of the first elongated member (1a);

measuring multiple parameters of the tip segment (30) of the wind turbine blade (28) by a plurality of first markers (18a) disposed on the airfoil region (34a) to determine the orientation of the tip segment (30) of the wind turbine blade (28).

20. The method according to any of items 18-19, the method comprising:

positioning a second tool assembly 102 adjacent to the airfoil region (35b) of the root segment (32) of the wind turbine blade (28), wherein the second tool assembly 102 includes at least one second elongated member (1b) with a second support plate (2b);

aligning the second support plate (2b) with the root segment (32) of the wind turbine blade (28), by a first pin (4b) configured to reside in the aperture defined in a root segment (32) of the wind turbine blade (28);

aligning a second measuring plate (3b) of an airfoil profile (35b) with the airfoil region (34b) of the root segment (32) of the wind turbine blade (28), wherein the second measuring plate (3b) is provided at another end of the second elongated member (1b);

measuring multiple parameters of the root segment (32) of the wind turbine blade (28) by a plurality of second markers (18b) disposed on the airfoil region (34b) to determine the orientation of the root segment (32) of the wind turbine blade (28).

21. The method according to any of items 18-20 comprising, aligning the provision (4) defined in the support plate (2) with another provision defined in the segment (32; 30) of the wind turbine blade (28) for supporting the tool assembly (101; 102) with the segment (32; 30) of the wind turbine blade (28).

LIST OF REFERENCE NUMERALS

1a first elongated member
2a second elongated member
2a first support plate
2b second support plate
3a first measuring plate
3b second measuring plate
4a aperture
4b first pint
5 second side plate
6 third reinforcing member
7, 15 handle 9a first reinforcing members
9b second reinforcing members
10 wind turbine
12 tower
13 bushing
14 support surface
16a, 16b handle
17a first restraining member
17b second restraining member
18a first markers
18b second markers
19 blade root end
20 gear box
22 rotor
24 rotor shaft
26 rotatable hub
27 first side plate
28 wind turbine blade or Rotor blade
30 tip segment
32 root segment
32a first shell half structure of root end segment
32b second shell half structure of root end segment
32c aero foil region
32d transition region
32e shoulder
33 nacelle
34a aero foil region of the tip segment
34b aero foil region of the root segment
35a aero foil profile of the first measuring plate
35b aero foil profile of the second measuring plate
36 internal support structures
37 blade tip
38 arrow
39 generator
40 beam structure
42 shear web on tip end segment
44 and 46 spar cap
48 chord wise member
50 pin Joint slot
52 span-wise extending pin
54 receiving end
56 span-wise pin joint slot
58 chord-wise pin joint slot
60 receiving section
60a spar element
60b extended portion of the spar element
62 chord-wise extending pin
66 spar structures
100 apparatus
101 first tool assembly
102 second tool assembly
We claim:

1. An apparatus for determining orientation of a segment, the apparatus comprising:
   an elongated member;
   a support plate provided at one end of the elongated member, the support plate defined with one or more connecting structures provisions to facilitate connection with the segment;
   a measuring plate at another end opposite to the one end of the elongated member, wherein the measuring plate is defined with an airfoil profile, and includes a plurality of markers disposed along an airfoil region of the segment,
   wherein each of the plurality of markers is indicative of one or more of multiple parameters to determine the orientation of the segment.

2. The apparatus according to claim 1, wherein the orientation of the airfoil region of the first segment of a wind turbine blade is determined using the apparatus.

3. The apparatus according to claim 2, wherein the segment of the wind turbine blade comprises one of a root segment or a tip segment, wherein the one or more connecting structures comprises an aperture configured to accommodate a second pin extending from the tip segment, and/or wherein the one or more connecting structures comprises a first pin extending from the support plate and is structured to reside in the aperture defined in a root segment of the wind turbine blade.

4. The apparatus according to claim 2, wherein each of the plurality of markers are adjustable to conform to the airfoil region of the segment of the wind turbine blade.

5. The apparatus according to claim 1, wherein a shape of the measuring plate corresponds to the airfoil region of the segment of the wind turbine blade.

6. The apparatus according to claim 1, wherein the multiple parameters comprises a diameter of the airfoil region and a length of the airfoil region.

7. The apparatus according to claim 1, further comprising at least one second side plate provided at a pre-determined distance from the elongated member,
   wherein the least one second side plate extends in a direction perpendicular to the elongated member and connects to the measuring plate, and wherein the at least one second side plate is provided with a bushing and a handle for positioning the measuring plate adjacent to the airfoil region of the segment.

8. The apparatus according to claim 7, further comprising at least one reinforcement member extending from the at least one second side plate to the measuring plate for retaining the shape of the measuring plate.

9. A system for determining orientation of a tip segment and a root segment of a wind turbine blade, the system comprising:
   a first tool assembly for determining orientation along an airfoil region of the tip segment, the first tool assembly comprising:
   at least one first elongated member;
   a first support plate provided at one end of the first elongated member;
   a first measuring plate at another end opposite to the one end of the first elongated member;
   a plurality of first markers disposed on the airfoil region wherein, each of the plurality of first markers is indicative of one or more of multiple parameters to determine the orientation of the tip segment of the wind turbine blade;
   a second tool assembly for determining orientation of an airfoil region of the root segment of the wind turbine blade, the second tool assembly comprising:
   at least one second elongated member;
   a second support plate provided on one end of the second elongated member;
   a second measuring plate at another end opposite to the one end of the second elongated member;
   a plurality of second markers disposed on the airfoil region wherein, each of the plurality of second markers is indicative of one or more of multiple parameters to determine the orientation of the root segment of the wind turbine blade.

10. The system according to claim 9, wherein the first support plate is defined with at least one aperture for accommodating a second pin of a spar structure extending from the tip segment of the wind turbine blade.

11. The system according to claim 9, wherein the first measuring plate is defined with an airfoil profile corresponding to the airfoil region of the tip segment of the wind turbine blade, and/or wherein the second support plate includes at least one first pin, structured for an aperture defined in the root segment of the wind turbine blade, and/or wherein the second measuring plate is defined with an airfoil profile corresponding to the airfoil region of the root segment the wind turbine blade.

12. A method for determining orientation along an airfoil region of a segment of a wind turbine blade, the method comprising:

positioning a tool assembly adjacent to the airfoil region of the segment of the wind turbine blade, wherein the tool assembly comprises an elongated member with a support plate;

aligning the support plate with the segment of the wind turbine blade, by an aperture in the support plate;

aligning a measuring plate of an airfoil profile with the airfoil region of the segment of the wind turbine blade, wherein the measuring plate is provided at another end opposite to the one end of the elongated member;

measuring multiple parameters of the segment of the wind turbine blade by a plurality of markers disposed on the airfoil region to determine the orientation of the segment of the wind turbine blade.

13. The method according to claim 12, further comprising:

positioning a first tool assembly adjacent to the airfoil region of the tip segment of the wind turbine blade, wherein the first tool assembly includes at least one first elongated member with a first support plate;

aligning the first support plate with the tip segment of the wind turbine blade, by an aperture configured to accommodate a second pin extending from the tip segment;

aligning a first measuring plate of an airfoil profile with the airfoil region of the tip segment of the wind turbine blade, wherein the first measuring plate is provided at another end of the first elongated member; and measuring multiple parameters of the tip segment of the wind turbine blade by a plurality of first markers disposed on the airfoil region to determine the orientation of the tip segment of the wind turbine blade.

14. The method according to claim 12 further comprising:

positioning a second tool assembly adjacent to the airfoil region of the root segment of the wind turbine blade, wherein the second tool assembly comprises at least one second elongated member with a second support plate;

aligning the second support plate with the root segment of the wind turbine blade, by a first pin configured to reside in the aperture defined in a root segment of the wind turbine blade;

aligning a second measuring plate of an airfoil profile with the airfoil region of the root segment of the wind turbine blade, wherein the second measuring plate is provided at another end of the second elongated member; and measuring multiple parameters of the root segment of the wind turbine blade by a plurality of second markers disposed on the airfoil region to determine the orientation of the root segment of the wind turbine blade.

15. The method according to claim 12, further comprising aligning the aperture defined in the support plate with another connecting structure defined in one of the tip segment or the root segment of the wind turbine blade for supporting the tool assembly with one of the tip segment or the root segment of the wind turbine blade.

* * * * *